(12) United States Patent
Mansour et al.

(10) Patent No.: US 11,305,701 B2
(45) Date of Patent: Apr. 19, 2022

(54) CROSSBAR ASSEMBLY

(71) Applicant: Dura Operating, LLC, Auburn Hills, MI (US)

(72) Inventors: Amer Mansour, West Bloomfield, MI (US); Rui de Oliveira, Detroit, MI (US); Cumhur Unveren, Walled Lake, MI (US); Rafal Golab, Brandon Township, MI (US)

(73) Assignee: DUS OPERATING INC., Auburn Hills, MI (US)

( * ) Notice: Subject to any disclaimer, the term of this patent is extended or adjusted under 35 U.S.C. 154(b) by 34 days.

(21) Appl. No.: 16/281,510

(22) Filed: Feb. 21, 2019

(65) Prior Publication Data
US 2019/0256007 A1 Aug. 22, 2019

Related U.S. Application Data

(60) Provisional application No. 62/633,201, filed on Feb. 21, 2018.

(51) Int. Cl.
*B60R 9/058* (2006.01)
*B60R 9/052* (2006.01)

(52) U.S. Cl.
CPC ............ *B60R 9/058* (2013.01); *B60R 9/052* (2013.01)

(58) Field of Classification Search
CPC .. B60R 9/04; B60R 9/048; B60R 9/10; B60R 9/052; B60R 9/058; B60J 7/1607; B60J 7/106

USPC .......... 224/309, 329–331, 558, 322
See application file for complete search history.

(56) References Cited

U.S. PATENT DOCUMENTS

| | | | |
|---|---|---|---|
| 3,917,136 A | 11/1975 | Carson | |
| 4,911,348 A * | 3/1990 | Rasor | B60R 9/045 224/321 |
| 4,995,538 A | 2/1991 | Marengo | |
| 2005/0252053 A1 | 11/2005 | Pena | |
| 2013/0153617 A1 | 6/2013 | Bierman et al. | |
| 2015/0069102 A1 * | 3/2015 | Hubbard | B60R 9/045 224/320 |
| 2015/0239402 A1 * | 8/2015 | Hubbard | B60R 9/04 224/321 |

FOREIGN PATENT DOCUMENTS

FR 2583357 A1 12/1986

* cited by examiner

*Primary Examiner* — Nathan J Newhouse
*Assistant Examiner* — Matthew T Theis
(74) *Attorney, Agent, or Firm* — Vivacqua Crane PLLC

(57) ABSTRACT

A crossbar assembly for a motor vehicle having a detachable roof and a roll bar includes a stanchion having a first connection portion configured to connect in a first configuration the stanchion to the roof when the roof is attached to the roll bar, the stanchion having a second connection portion configured to connect in a second configuration to the roll bar when the roof is removed from the roll bar. A crossbar is connected to the stanchion.

8 Claims, 10 Drawing Sheets

CROSSBAR ASSEMBLY

FIELD

The present disclosure relates generally to a crossbar assembly for a motor vehicle, and more particularly to a crossbar assembly that may be installed on a roof of a vehicle or a roll bar structure when the roof is removed.

BACKGROUND

The statements in this section merely provide background information related to the present disclosure and may or may not constitute prior art.

To increase the cargo capacity of a motor vehicle, a crossbar assembly may be installed on the roof of the motor vehicle. Cargo may be secured to the crossbar assembly which acts as a universal attachment point between the motor vehicle and the cargo. Examples of cargo include ski or snowboards, bikes, cargo cages, or cargo containers, to name but a few. The crossbar assembly is typically attached directly to the roof panel of the motor vehicle. However, many motor vehicles have removable roof panels. Thus, there is a need in the art for a crossbar assembly that may be used with a motor vehicle that has a removable roof.

SUMMARY

According to several aspects, a crossbar assembly includes a rail that attaches to a roof of a motor vehicle or a roll bar structure of the motor vehicle. A crossbar attaches to the rail through a stanchion. An adapter pad is attached to an underside of the rail. The adapter pad has an outer contour surface that matches an outer surface of the roof and the hydroformed tube. A strap assembly secures the rail with the roof. A bolt connects the rail to the roll bar structure when the roof is removed.

In another aspect, a crossbar assembly includes a channel that is formed into the roof panel and a stanchion supports the crossbar. The stanchion may be secured to the channel when the roof panel is on the motor vehicle or may be secured to the roof rail when the roof panel is removed.

In another aspect, a metal bracket is used to connect the stanchion to the roof rail.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
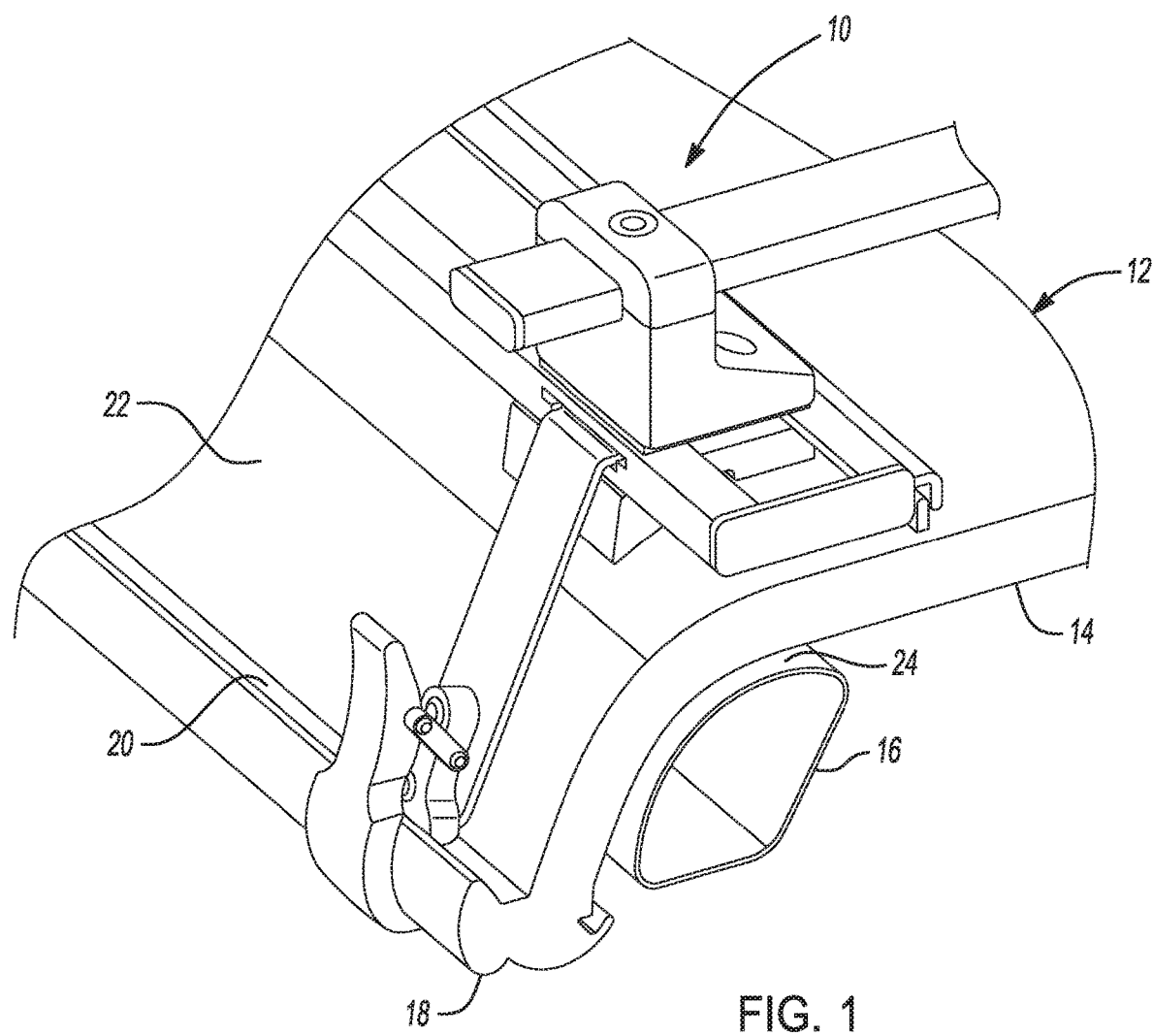
FIG. 1 is a front perspective view of a crossbar assembly attached to a roof panel of a motor vehicle.

Referring to FIG. 1, a crossbar assembly, hereinafter 'the assembly', is generally indicated by reference number 10. The assembly 10 is removably mounted to an exemplary roof structure 12 of a motor vehicle. In the example provided, the roof structure 12 generally includes a roof panel 14 mounted to a roll bar structure 16. The roll bar structure 16 is comprised of generally tubular members on each side of the vehicle that extend upwardly from the vehicle body to form a frame or cage around a portion of the vehicle body. The roll bar structure 16 can be formed of a variety of materials, including steel or aluminum, and may be manufactured using various methods such as bending or hydroforming. The roof panel 14 includes a drip rail 18 that extends along an outer edge of the roof panel 14. The drip rail 18 defines a groove 20 for collecting water. An outer surface 22 of the roof panel 14 has a contour or shape that substantially matches an outer surface 24 of the roll bar structure 16. The roof panel 14 is removable from the roll bar structure 16. It should be appreciated that the roof structure 12 may have various other configurations and shapes without departing from the scope of the present invention.

Figure 2:
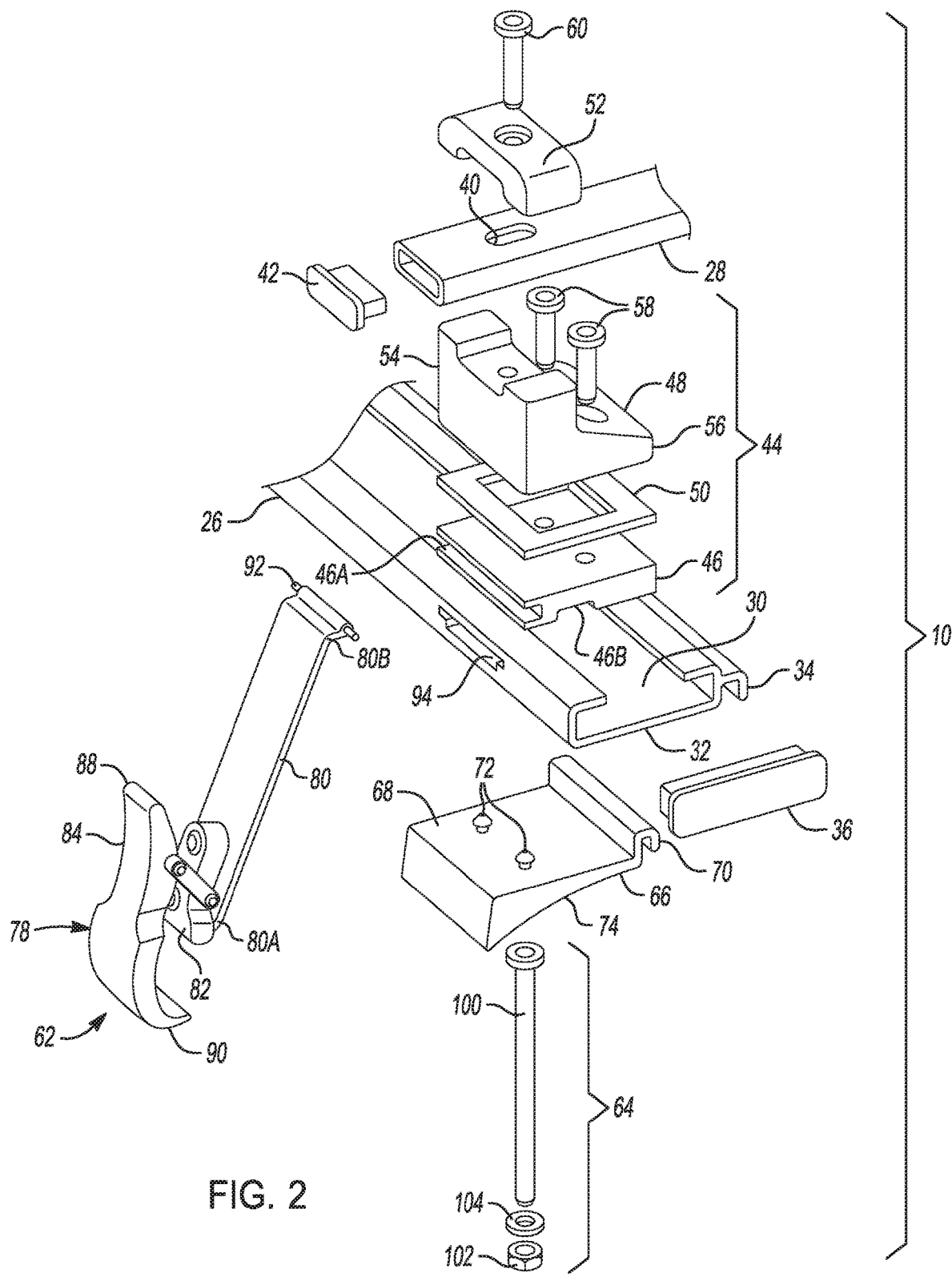
FIG. 2 is an exploded perspective view of the crossbar assembly of FIG. 1.

Turning to FIG. 2, the assembly 10 generally includes a rail 26 and a crossbar 28. The rail 26 is connectable to the roof structure 12 while cargo (not shown) is mountable to the crossbar 28. It should be appreciated that for a given motor vehicle application the assembly 10 will have two rails 26 and two crossbars 28. The rail 26 has a 'C'-shaped cross-section that defines a channel 30. The rail 26 has a flat bottom surface 32. An 'L'-shaped flange 34 extends out from a side of the rail 26. A channel cap 36 is inserted into an end of the channel 30.

The crossbar 28 may include features that allow cargo to be attached thereto and is generally cylindrical with a mounting hole 40 formed at each end (only one of which is shown). A crossbar cap 42 is inserted into an end of the cylindrical crossbar 28. The crossbar 28 is mounted perpendicularly relative to the rail 26 by a mounting assembly 44. The mounting assembly 44 includes a moveable plate 46, a stanchion 48, a rubber ring 50, and a stanchion cover 52.

The moveable plate 46 is disposed within the channel 30 of the rail 26 and is translatable along the length of the rail 26. The moveable plate 46 includes a side groove 46A and a bottom groove 46B. The grooves 46A, 46B accommodate different methods of attaching the rail 26 to the roof structure 12, as will be described below.

The stanchion 50 includes a support collar 54 that extends up from a base portion 56. The stanchion 50 is fixed to the moveable plate 46 by fasteners 58 that extend through the base portion 56 and into the moveable plate 46. The rubber ring 48 is disposed between the moveable plate 46 and the stanchion 50 to act as a shock absorber. The crossbar 28 is supported within the support collar 54. The stanchion cover 52 is disposed overtop the crossbar 28 and contacts the support collar 54 of the stanchion 50. A fastener 60 secures the stanchion cover 52 to the stanchion 48 to clamp the crossbar 28 therebetween. The fastener 60 passes through the hole 40 of the crossbar 28.

The rail 26 is securable to the roof structure 12 of a motor vehicle by one of two attachment mechanisms including a strap assembly 62 and a bolt assembly 64. In both attachment mechanisms, an adapter pad 66 is disposed between the rail 26 and the roof structure 12. The adapter pad 66 includes a flat top surface 68 that mates with the flat bottom surface 30 of the rail 26 and a flange 70 that mates with the flange 34 of the rail 26. The adapter pad 66 is preferably formed of a material that can support loads and not scratch or mar surfaces the adapter pad 66 contacts, preferably a polymeric or elastomeric material, and more preferably a rubber material. Attachment features 72 may be disposed on the flat top surface 68 to secure the adapter pad 66 to the rail 26. The adapter pad 66 also includes a contoured bottom surface 74. The contoured bottom surface 74 has a contour or shape that matches the outer surface 22 of the roof panel 14 and the outer surface 24 of the hydroformed rail 16.

Figure 3:
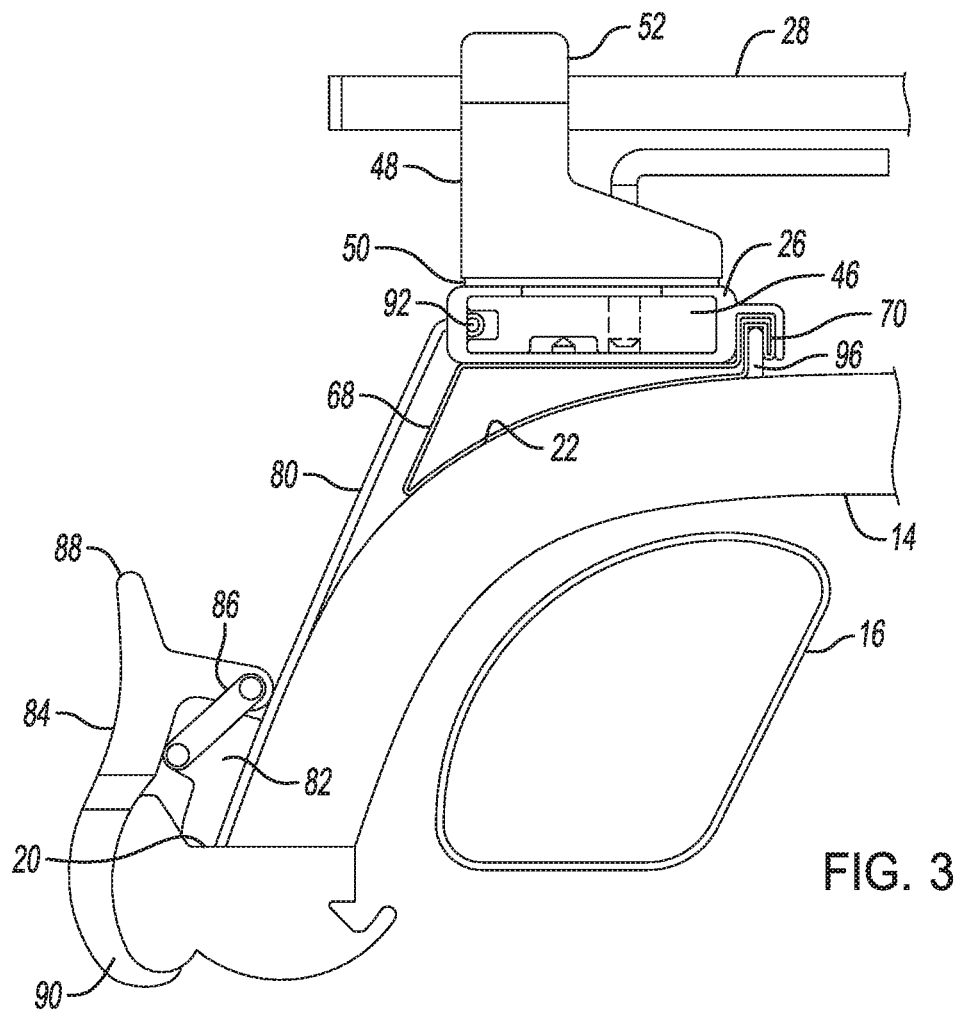
FIG. 3 is a front cross-sectional view of the crossbar assembly attached to a roof panel of a motor vehicle.

Turning to FIG. 3 and with continued reference to FIG. 2, the strap assembly 62 is used to secure the rail 26 to the roof panel 14. The strap assembly 62 includes a clamping mechanism 78 connected to a strap 80. The clamping mechanism 78 includes a secondary clamp 82 connected to a first end 80A of the strap 80. A main clamp 84 is pivotally connected to the secondary clamp 82 by one or more hinge bars 86. The main clamp 84 includes a handle 88 and a clamp 90.

Figure 4:
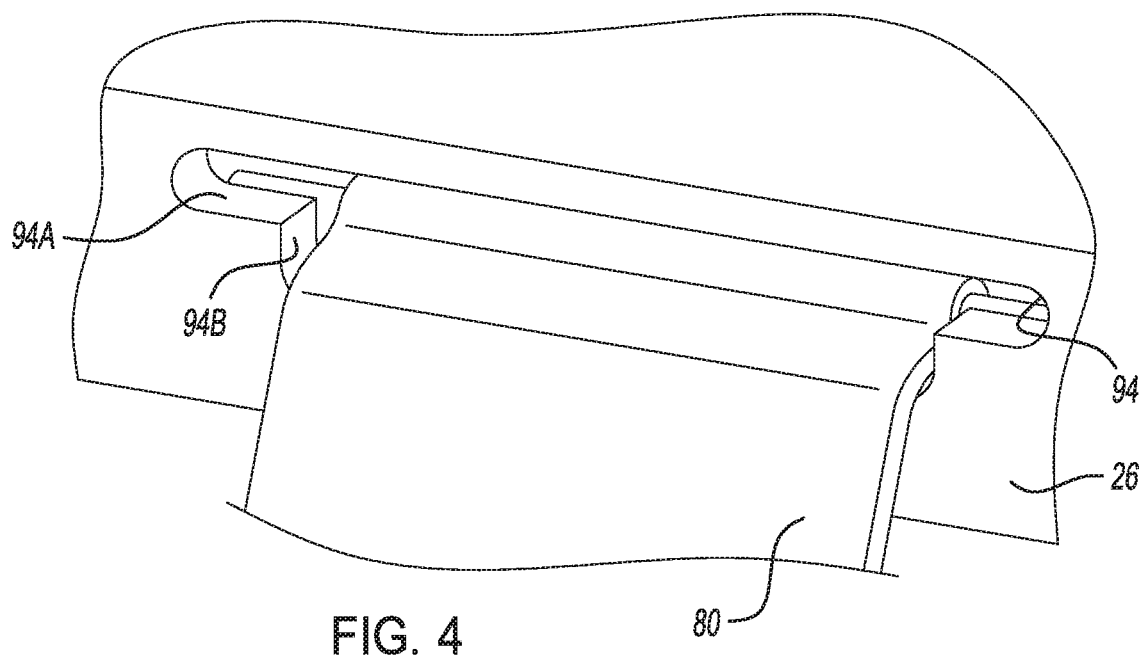
FIG. 4 is an enlarged perspective view of a portion of a rail of the crossbar assembly.

The strap 80 is connected at a second end 80B to the rail 26 by a pin 92. The pin 92 is connected to the second end 80B of the strap 80. As best shown in FIG. 4, the rail 26 includes a window 94 that receives the pin 92. The window 94 has a wide upper portion 94A such that the pin 92 may be removed from the window 94 and a narrow bottom portion 94B to retain the pin 92 when the strap 80 is pulled down and is taut.

To secure the rail 26 to the roof panel 14, the rail 26 is placed on the roof panel 14 such that the adapter pad 68 mates with the outer surface 22 of the roof panel 14. In the example provided, the flange 70 of the adapter pad 66 attaches to a rib 96 formed on the outer surface 22 of the roof panel 14. Next, the secondary clamp 82 is disposed within the groove 20 of the drip rail 18. The main clamp 84 is then swung around the drip rail 18 so that the clamp 90 hooks to the bottom of the drip rail 18. Next, the clamp handle 88 is moved inboard towards the roof panel 14 until the clamp mechanism 78 is locked. To attach the crossbar 28 to the rail 26, first the crossbar 28 is secured to the stanchion 48 using the stanchion cover 52 and the fastener 60. The moveable plate 46 may be slid within the channel 30 to a desired location utilizing roof panel markings (not shown). The groove 46A provides clearance to the pin 92 of the strap 80 disposed within the channel 30 of the rail 26. The stanchion 48 is then secured to the moveable plate 46 using the fasteners 58.

Figure 5:
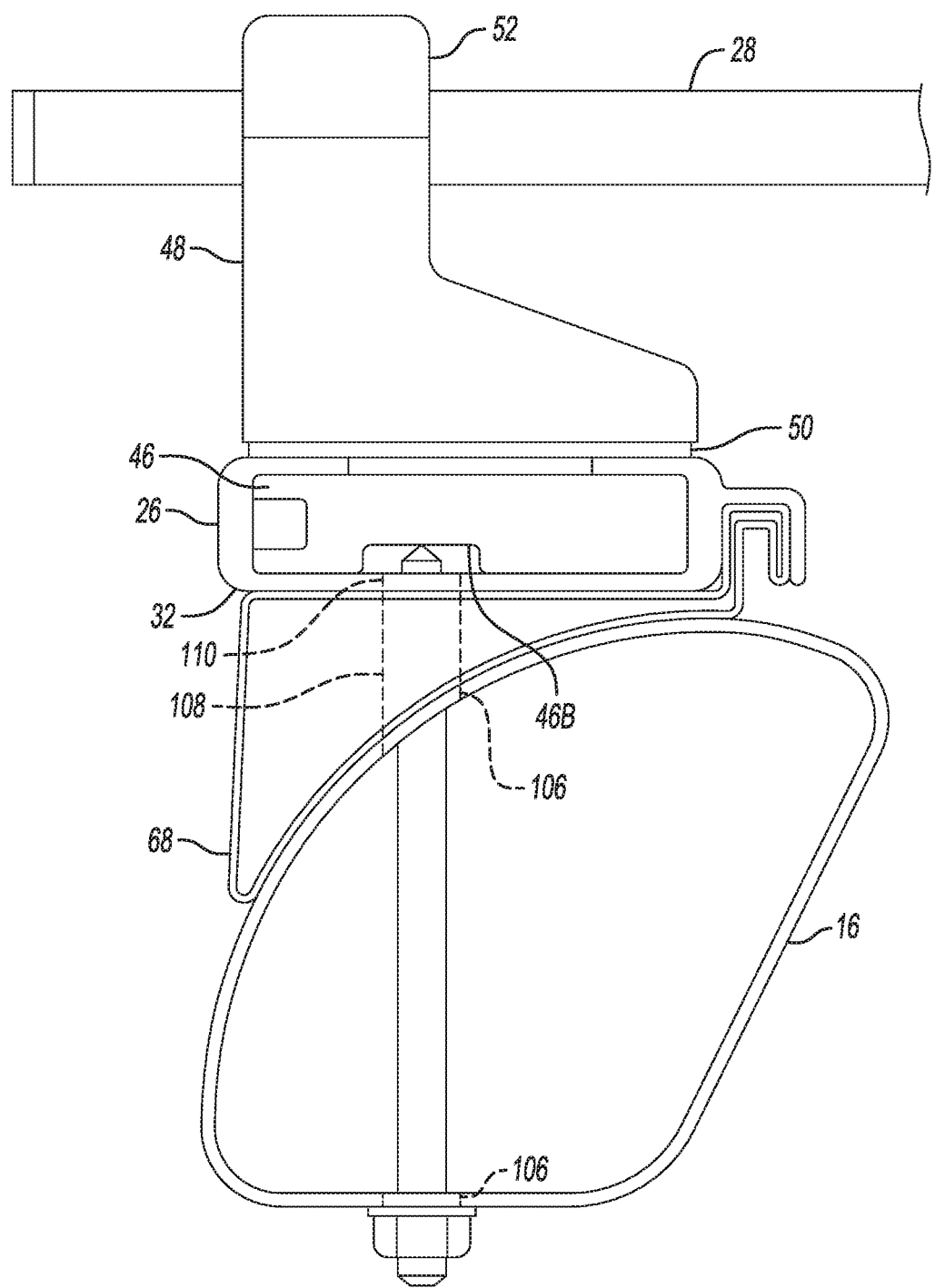
FIG. 5 is a front cross-sectional view of the crossbar assembly attached to a roll bar structure of a motor vehicle when the roof panel has been removed.

With reference to FIGS. 2 and 5, the bolt assembly 64 is used to secure the rail 26 to the roll bar structure 16 when the roof panel 14 is removed from the motor vehicle. The bolt assembly 64 includes a roll bar structure bolt 100, and a roll bar structure locknut 102 and washer 104. The bolt 100 extends through a hole 106 formed in both sides of the roll bar structure 16, through a hole 108 formed through the adapter pad 68, and through a hole formed in the bottom surface 32 of the rail 26. The washer 104 and nut 102 are then used to tighten the bolt 100 in place.

To install the rail 26 onto the roll bar structure 16, first the rail is placed onto the roll bar structure 16 such that holes 110 and 108 align with holes 106. The lower surface 74 of the adapter pad 68 mates with the outer surface 24 of the roll bar structure 16. The bolt 100 is then inserted through the holes 110, 108, and 106. The washer 104 and nut 102 are then installed and tightened. The crossbar 28 is installed in the same manner as described above. Of note, the groove 46B in the moveable plate 46 provides clearance to the bolt 100 within the channel 30 of the rail 26.

Figure 6:
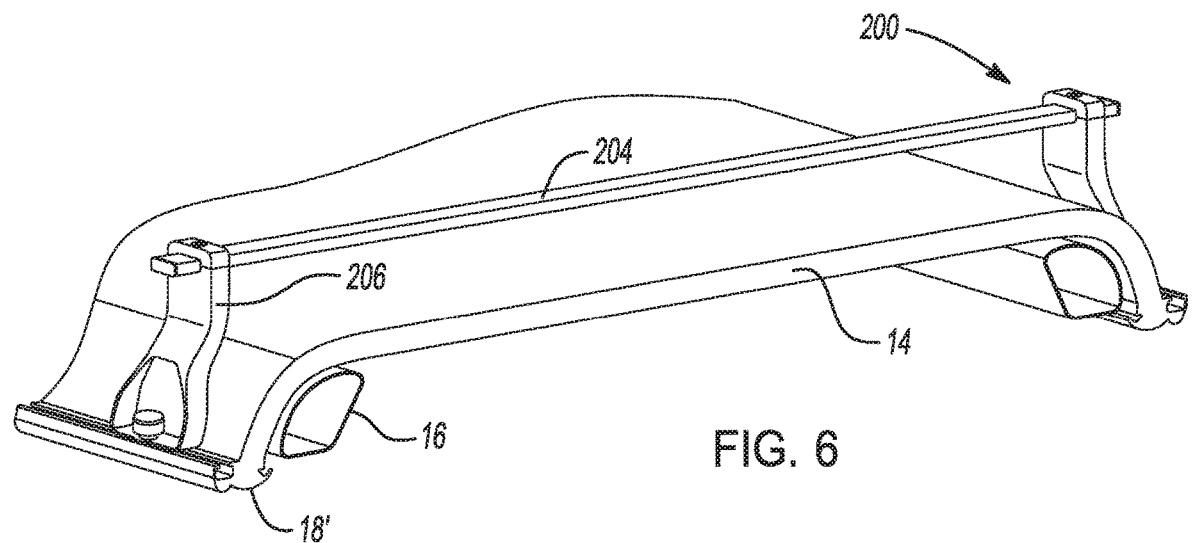
FIG. 6 is a front perspective view of another crossbar assembly attached to a roof panel of a motor vehicle.
Figure 7:
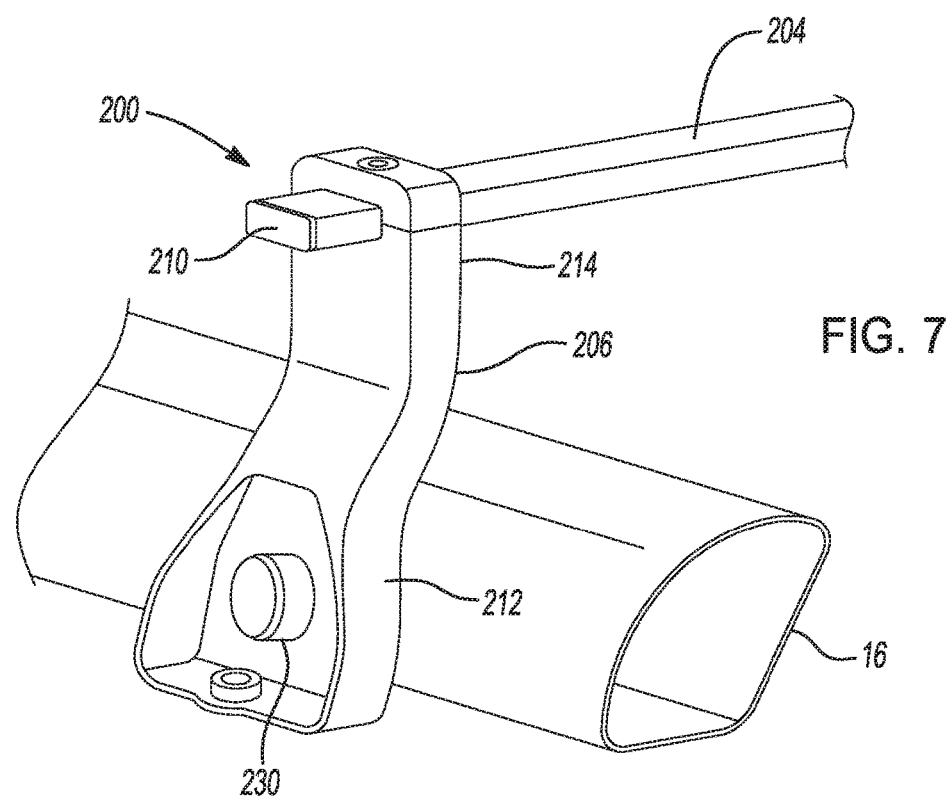
FIG. 7 is a front perspective view of the crossbar assembly of FIG. 6 attached to a roll bar structure of a motor vehicle when the roof panel has been removed.

Turning now to FIGS. 6 and 7, another embodiment of a crossbar assembly, hereinafter 'the assembly', is generally indicated by reference number 200. The assembly 200 is removably mounted to either the roof panel 14 in a first configuration, as shown in FIG. 6, or the roll bar structure 16 in a second configuration, as shown in FIG. 7.

Figure 8:
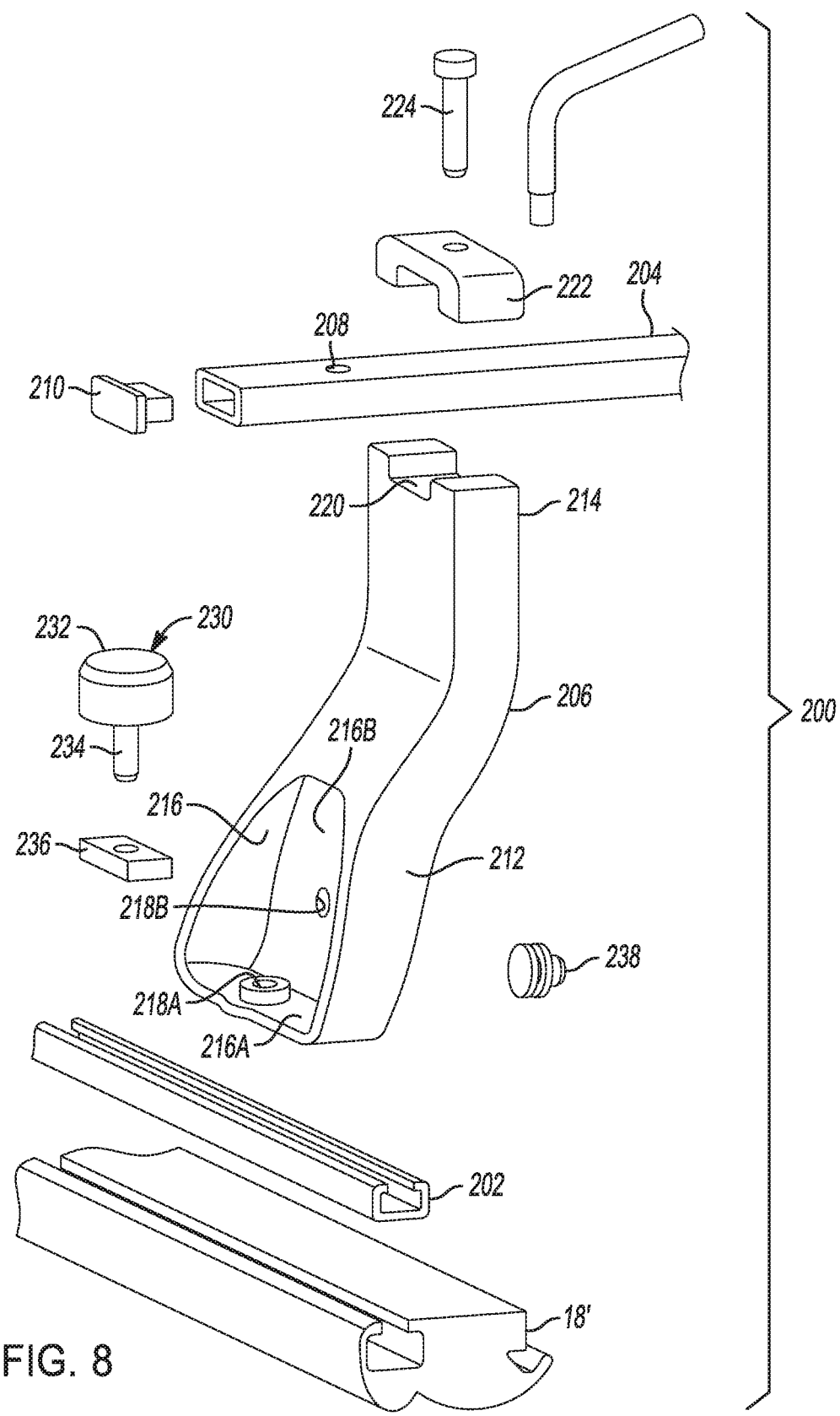
FIG. 8 is an exploded perspective view of the crossbar assembly of FIG. 6.

With reference to FIG. 8, the assembly 200 includes a channel 202, a crossbar 204, and a stanchion 206. The channel 202 is generally 'C'-shaped and is molded into a modified drip rail 18' of the roof panel 14.

The crossbar 204 may include features that allow cargo to be attached thereto and is generally cylindrical with a mounting hole 208 formed at each end (only one of which is shown). A crossbar cap 210 is inserted into an end of the cylindrical crossbar 204. The crossbar 204 is mounted perpendicularly relative to the channel 202 by the stanchion 206. The crossbar 204 is configured to move relative to the stanchion 206 to allow for different lateral spacing between the first configuration and the second configuration. Thus, the crossbar is connected to the stanchion at a first area when in the first configuration and at a second area different from the first area when in the second configuration since the lateral spacing, i.e. cross-vehicle spacing, between opposing roof rails 18 and the lateral spacing between opposing roll bars 16 are different.

The stanchion 206 is alternatively fixed to one of the channel 202 or the roll bar structure 16, as will be described below. The stanchion 206 includes a base portion 212 fixable to the channel 202 and a support collar 214 fixable with the crossbar 204. The base portion includes a recess 216 formed in a side thereof. The recess 216 is partially defined by a bottom surface 216A and a side surface 216B. A first connection portion, for example a first or bottom hole 218A is formed in the bottom surface 216A and a second connection portion, for example a second or side hole 218B is formed in the side surface 216B. It should be appreciated that the first connection portion and the second connection portion may include additional or different features so long as these portions allow for connection between the stanchion 206 and the roof 14 or roll bar 16. The support collar 214 extends up from the base portion 212. The support collar 212 includes a mounting hole 220 formed therein. The crossbar 204 is supported within the support collar 214. A stanchion cover 222 is disposed overtop the crossbar 204 and contacts the support collar 214 of the stanchion 206. A fastener 224 secures the stanchion cover 222 to the stanchion 206 to clamp the crossbar 204 therebetween. The fastener 224 passes through the mounting hole 208 of the crossbar 204 and is disposed in the mounting hole 220 of the stanchion 206.

Figure 9:
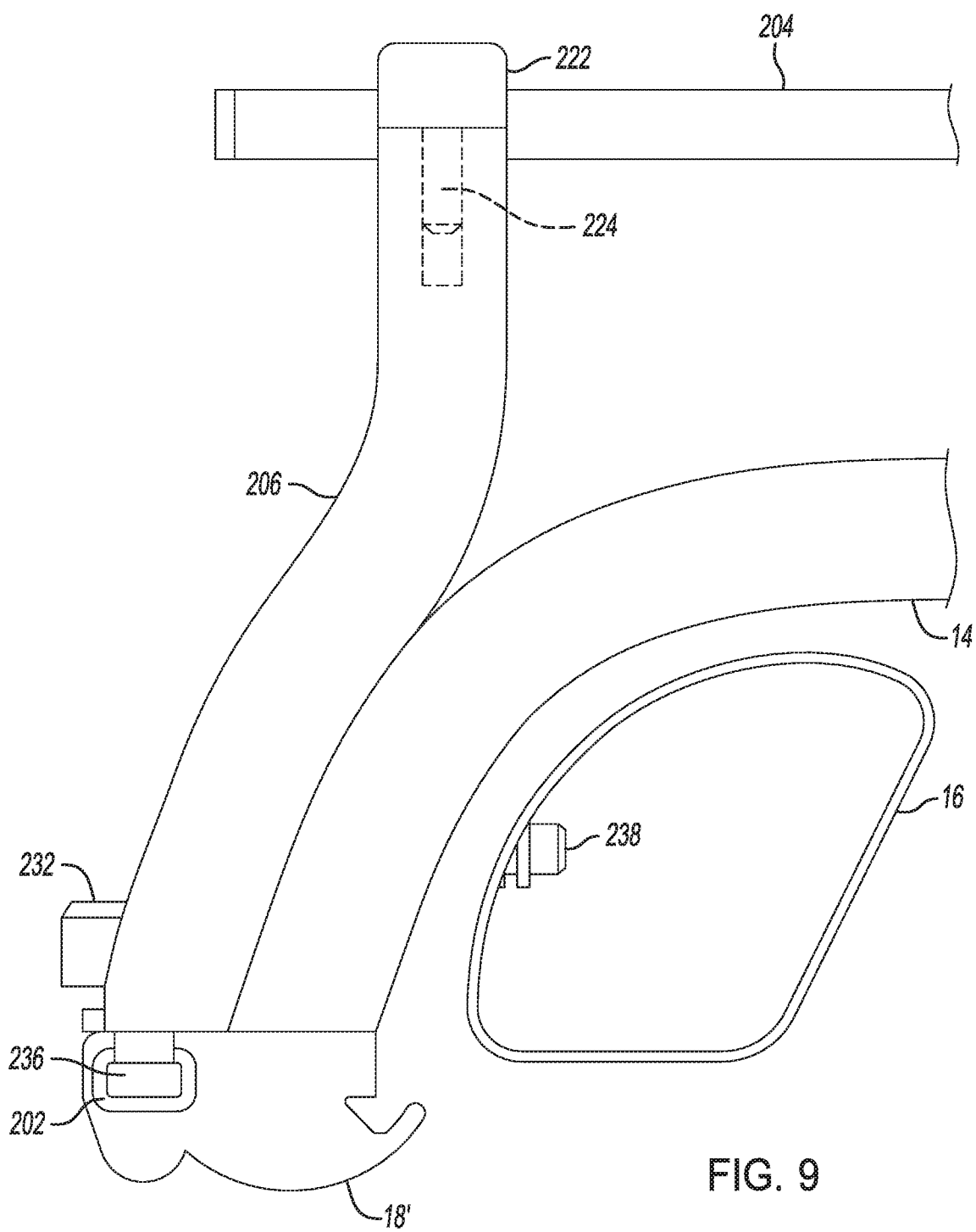
FIG. 9 is a front cross-sectional view of the crossbar assembly of FIG. 6 attached to a roof panel of a motor vehicle.

With reference to FIGS. 8 and 9, the stanchion 206 may be connected to the roof structure 12 of a motor vehicle by a fastener such as a bolt knob 230. The bolt knob 230 includes a handle 232 connected to a bolt 234. To connect the stanchion 206 to the roof panel 14, a guide or T-slot nut 236 is inserted into the channel 202 and moved to a desired location relative to markings on the roof panel 14 (not shown). The guide 236 may have different configurations but is configured to slide within the channel 202 while securing the knob bolt 230. The stanchion 206 is then placed on the channel 202 and the bottom hole 218A is aligned with the T-slot nut 236. Finally, the knob bolt 230 is inserted through the bottom hole 218A and the T-slot nut 236 and tightened. The knob bolt 230 is, when installed, disposed within the recess 216 of the stanchion 206. This process is repeated for the remaining stanchion 206 that supports the crossbar 204. The crossbar 204 may be attached to the stanchion 206 in a manner similar to that described above for the assembly 10.

Figure 10:
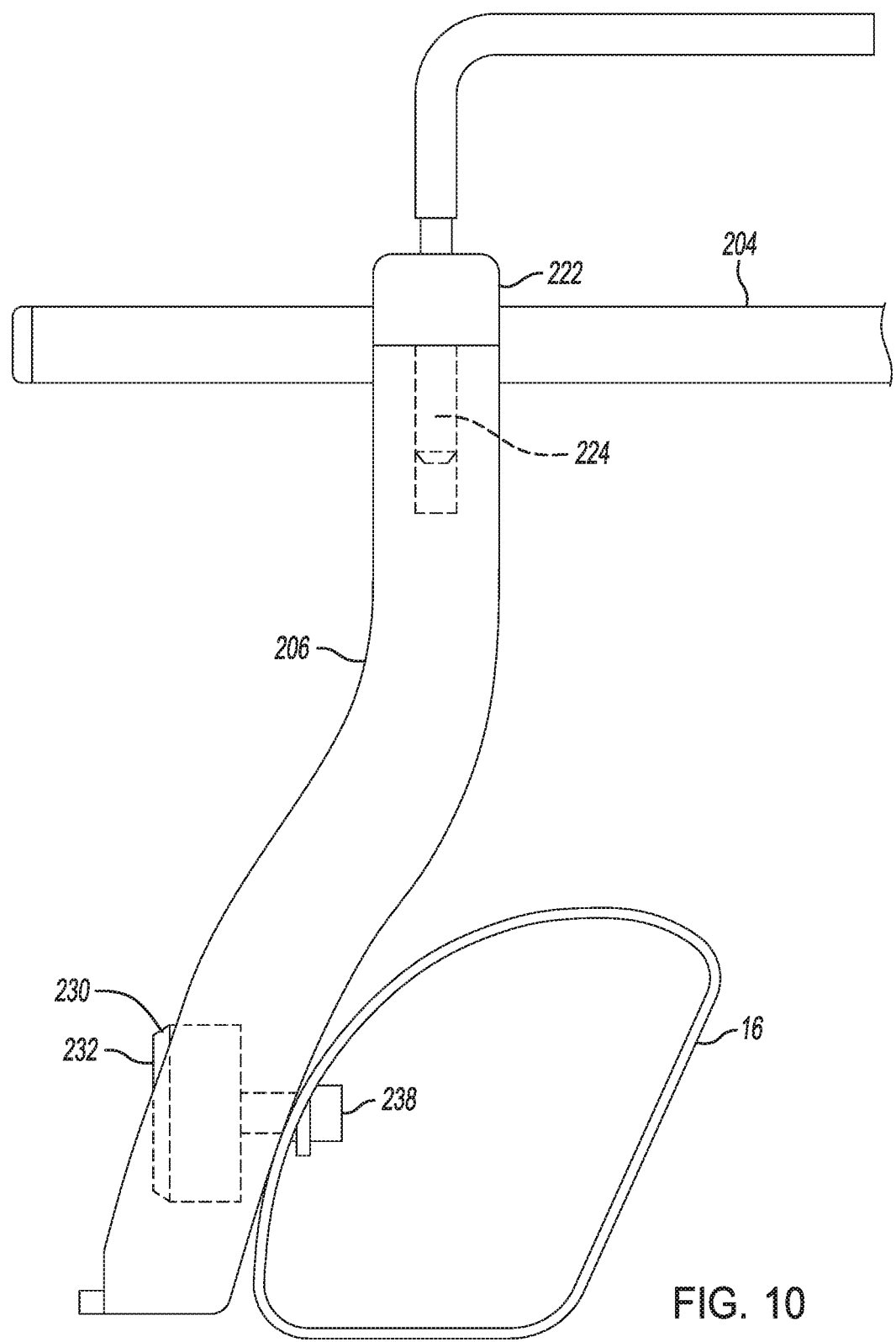
FIG. 10 is a front cross-sectional view of the crossbar assembly of FIG. 6 attached to a roll bar structure of a motor vehicle when the roof panel has been removed.

With reference to FIGS. 8 and 10, to connect the stanchion 206 to the roll bar structure 16 when the roof panel 14 has been removed, the side hole 218B is aligned with a rivet nut 238 that has been installed in the roll bar structure 16. The knob bolt 230, or a second fastener (not shown) different from the knob bolt 230, is inserted through the side hole 218B and the rivet nut 238 and tightened. The knob bolt 230 is, when installed, disposed within the recess 216 of the stanchion 206.

Figure 11:
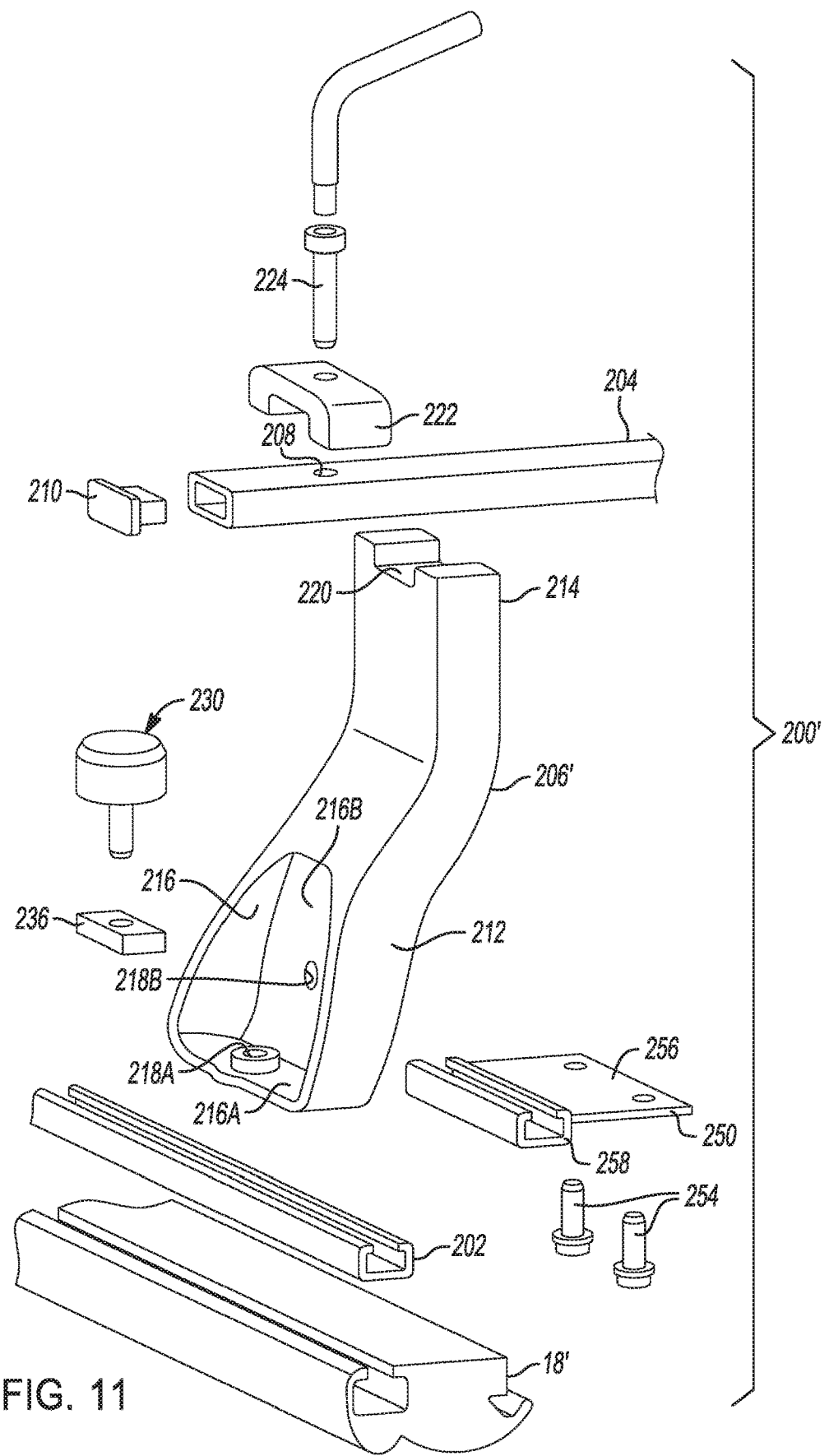
FIG. 11 is an exploded perspective view of another crossbar assembly.
Figure 12:
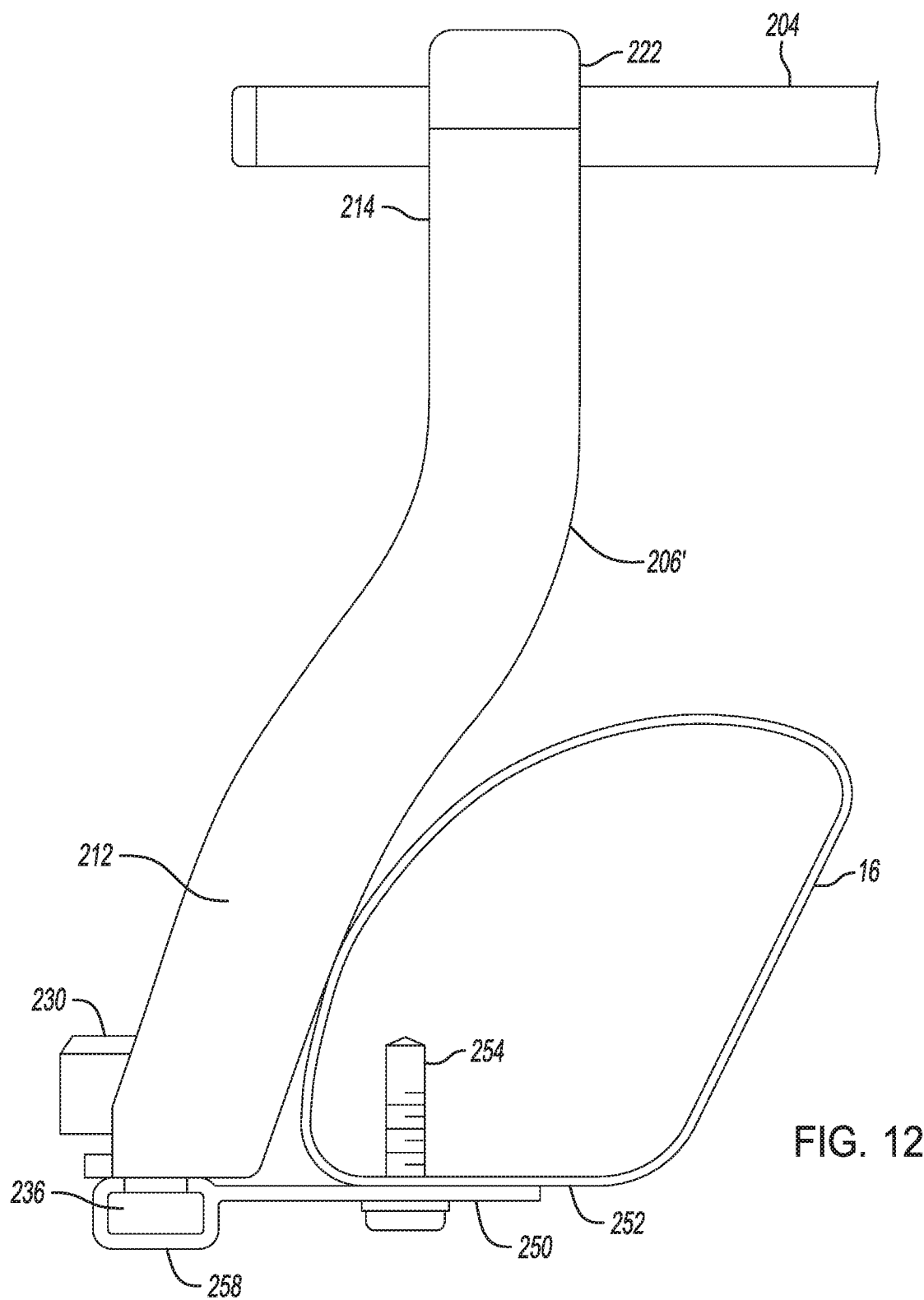
FIG. 12 is a front cross-sectional view of the crossbar assembly of FIG. 11 attached to a roll bar structure of a motor vehicle when the roof panel has been removed.

Turning now to FIGS. 11 and 12, an alternate rail and crossbar assembly is generally indicated by reference number 200'. The assembly 200' is substantially similar to the assembly 200 shown in FIGS. 6-10 and like components are indicated by like reference numbers. However, the assembly 200' includes a modified stanchion 206' that does not include the side hole 218B which used to mount the stanchion 206 to the roll bar structure 16 when the roof panel 14 is removed. Likewise, the rivet nut 238 is not installed in the roll bar structure 16. Instead, the assembly 202' includes a bracket 250 that is secured to an underside 252 of the roll bar structure 16 removably by fasteners 254, or permanently by welding (not shown) or other long-lasting fixation. The bracket 250 may be made of metal and includes a flat portion 256 and a channel 258 that extends out from a side of the flat portion 256, and may extend along a discrete portion of the roll bar structure 16 or along a substantial portion of the roll bar structure 16 to allow positioning of the stanchion 206' in various locations along the length of the bracket 250. The channel 258 has a similar shape as the channel 202.

The stanchion 206' is attached to the roof panel 14 in a manner identical to that described above for stanchion 206. To attach the stanchion 206' to the roll bar structure 16 when the roof panel 14 is removed, first the metal bracket 250 is attached to the roll bar structure 16 and secured using the fasteners 254. Next the T-slot nut 236, or a second guide (not shown) separate from the T-slot but 236, is inserted into the channel 258 of the metal bracket 250. The stanchion 206' is then placed on top of the T-slot nut 236 and the bottom hole 218A is aligned with the T-slot nut 236. The knob bolt 232, or a second fastener (not shown) different from the knob bolt 232, is inserted through the bottom hole 218A and the T-slot nut 236 and tightened.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A crossbar assembly for a motor vehicle having a detachable roof and a roll bar, the detachable roof having a drip rail defining a gutter for channeling water, the crossbar assembly comprising:
   a channel sized to fit within the gutter;
   a guide sized to fit within the channel;
   a fastener;
   a stanchion having a first connection portion configured to connect in a first configuration the stanchion to the roof when the roof is attached to the roll bar, the stanchion having a second connection portion configured to connect in a second configuration to the roll bar when the roof is removed from the roll bar;
   a crossbar connected to the stanchion; and
   a bracket connectable to the roll bar and connectable to the channel,
   wherein, when in the first configuration, the channel is disposed in the gutter of the drip rail, the guide is slidably disposed in the channel, and the fastener connects the stanchion to the guide,
   wherein the first connection portion includes a first hole disposed in a base portion of the stanchion, and the fastener is disposed through the first hole to connect the stanchion to the guide when in the first configuration, wherein the base portion includes a bottom surface and a side surface, and the first hole is disposed through the bottom surface, and
   wherein the fastener is disposed through the first hole and connected to the bracket which is connectable to the roll bar when in the second configuration.

2. The crossbar assembly of claim 1, wherein the first connection portion is spaced apart from the second connection portion.

3. The crossbar assembly of claim 1, further comprising a second hole disposed through the side surface of the stanchion, wherein the stanchion is connectable to the roll bar through the second hole via the fastener in a third configuration.

4. The crossbar assembly of claim 1, wherein the base portion includes a recess which is partially defined by the bottom surface and the side surface.

5. The crossbar assembly of claim 1, wherein the bracket includes a flat portion connectable to the roof rail and a bracket channel extended out from the flat portion, wherein, when in the second configuration, the bracket channel is disposed in the gutter of the drip rail.

6. The crossbar assembly of claim 5, wherein the guide is slidably disposed within the bracket channel and the fastener is connected to the guide when in the second configuration.

7. The crossbar assembly of claim 1, wherein the crossbar is configured to be moved relative to the stanchion to allow for different lateral spacing between the first configuration and the second configuration.

8. The crossbar assembly of claim 7, wherein the crossbar is connected to the stanchion at a first area when in the first configuration and at a second area different from the first area when in the second configuration.

* * * * *